US008555605B2

(12) United States Patent
Schmitz

(10) Patent No.: US 8,555,605 B2
(45) Date of Patent: Oct. 15, 2013

(54) METHOD OF CIGARETTE PACKAGING AND CIGARETTE PACKAGING SYSTEM

(75) Inventor: Reiner Schmitz, Bernex (CH)

(73) Assignee: JT International S.A., Geneva (CH)

( * ) Notice: Subject to any disclaimer, the term of this patent is extended or adjusted under 35 U.S.C. 154(b) by 0 days.

(21) Appl. No.: 13/080,291

(22) Filed: Apr. 5, 2011

(65) Prior Publication Data
US 2011/0265428 A1 Nov. 3, 2011

Related U.S. Application Data

(63) Continuation of application No. PCT/EP2009/062574, filed on Sep. 29, 2009.

(30) Foreign Application Priority Data

Oct. 6, 2008 (EP) .................................... 08165904

(51) Int. Cl.
B65B 57/00 (2006.01)
B65B 19/28 (2006.01)

(52) U.S. Cl.
USPC .................. 53/507; 53/443; 53/444; 53/449; 53/148

(58) Field of Classification Search
USPC ............. 53/443, 444, 445, 449, 473–475, 51, 53/507, 147, 148, 154
See application file for complete search history.

(56) References Cited

U.S. PATENT DOCUMENTS 6,209,290 B1 * 4/2001 Boriani et al. .................. 53/445
7,584,589 B2 * 9/2009 Stafford et al. ................. 53/154
7,891,158 B2 * 2/2011 Stafford et al. ................. 53/446
2001/0032138 A1 10/2001 Janiak et al.
2002/0097282 A1 * 7/2002 Maltseff ............................ 347/5
2003/0069793 A1 * 4/2003 Rudolph et al. ................ 705/19
2005/0077352 A1 * 4/2005 Gudbjartsson ................ 235/385
2007/0282716 A1 12/2007 Branigan et al.
2010/0170202 A1 * 7/2010 Bray et al. ...................... 53/444

FOREIGN PATENT DOCUMENTS

| DE | 199 51 140 A1 | 4/2001 |
|---|---|---|
| EP | 1 134 679 A2 | 9/2001 |
| EP | 1 645 992 A1 | 4/2006 |
| WO | WO 02/073551 | 9/2002 |
| WO | WO 2005/057378 | 6/2005 |
| WO | WO 2007/011863 | 1/2007 |

OTHER PUBLICATIONS

International Search Report for PCT/EP2009/062574 dated Nov. 25, 2009 and Written Opinion dated Apr. 12, 2011.
European Office Action for Application No. 08 165 904.7 dated Jul. 8, 2011.

* cited by examiner

Primary Examiner — Christopher Harmon
(74) Attorney, Agent, or Firm — Jenkins, Wilson, Taylor & Hunt, P.A.

(57) ABSTRACT

A method of cigarette packaging, the method comprising the steps of: Packing at least a first cigarette packet (52a) labeled with a first unique code (12a) and a second cigarette packet (52b) labeled with a second unique code (12b) into a first carton (10) and recording an information (56) that at least the two cigarette packets (52a,52b) with the first unique code (12a) and the second unique code (12b) are packed into the same carton (10) in a database; Packing the first carton (10) into a case (20); Detecting the first unique code (12a) in the case (20) and reading from the database all the unique codes (12b) of the cigarette packets (52b) that are packed into the same carton (10) as the detected first unique code (12a). Furthermore, a method for tracking cigarette packets (52a, 52b) and a cigarette packaging system is described.

5 Claims, 4 Drawing Sheets

METHOD OF CIGARETTE PACKAGING AND CIGARETTE PACKAGING SYSTEM

CROSS-REFERENCE TO RELATED APPLICATIONS

This application is a continuation of and claims priority to PCT/EP2009/062574 filed Sep. 29, 2009 which claims the benefit of and priority to European Patent Application No 08 165 904.7 filed Oct. 6, 2008, the entire disclosure of which is herein incorporated by reference.

The present invention relates to a method of cigarette packaging, to a method for tracking cigarette packets and to a corresponding cigarette packaging system.

BACKGROUND OF THE INVENTION

Many governments are interested in suppressing the black market for tobacco products. Therefore, these governments often ask the tobacco companies to track master cases, cartons or even single cigarettes packets from the factories to the first purchasers of these products.

Normally, cigarette packets are sold to a first purchaser in cases that contain between 50 and 2000 cigarette packets. Before the cigarette packets are packed into the case, an intermediate step often takes place, in which several cigarette packets are first packed into a carton. Then, a constant number of cartons are packed into the case. The number of cigarette packets in the carton and the number of cartons in the case may both be in the range between 10 and 100.

A conventional method to track a carton with several cigarette packets from the factory to its first purchaser comprises the steps of providing a carton code on the carton and providing a case code on the case in which the carton is packed. Generally, the carton code and the case code are both machine-readable codes. During the cigarette packaging process, the carton code is linked to the case code of the case in which the carton is packed. Then, the identity of the first purchaser of the case is linked to the corresponding case code in a database when the first purchaser orders the case or during the dispatch process. Thus, it is possible to track the carton to its first purchaser.

The production speed of cartons of an average factory is in the range of 80 to 120 cartons per minute. The number of cigarette packs produced per minute by an average factory is much higher. A typical production unit with high-speed machines produces between 800 and 1200 cigarette packets per minute. It is expected that such a production unit will get even faster and that the number of cigarette packets produced per minute will increase in the future.

Due to the high production speed of an average manufacturing unit, it is hardly possible to track an individual cigarette packet to its first purchaser. Furthermore, the difficulties of tracking an individual cigarette packet to its first purchaser are increased by the fact that often different generations of cigarette producing machines are used in a manufacturing unit.

Therefore, even though the tracking of cartons is already feasible today, the tracking of an individual cigarette packet from the factory to its first purchaser is not yet possible.

US 2001/0032138 A1 and EP 1 134 679 A2 both describe a method of providing taxable product information and a corresponding tracking system. To track individual packs of a product, for instance cigarette packets, to a purchaser, it is suggested to provide identifying indicia such as a laser code or a mark on each pack. Preferably, the identifying indicia may comprise a serial number, wherein all packs packed into the same carton may have the same serial number. Thus, it is possible to link a pack with a carton sold to its purchaser. However, the method and the system described in US 2001/0032138 A1 and EP 1 134 679 A2 are very time-consuming and therefore hardly usable with regard to the high production speed of an average cigarette manufacturing unit.

EP 1 645 992 A1 describes a method of marking manufacturing items wherein each single manufacturing item is provided with a unique code. The codes for the items are provided by a general distributor, e.g. via a secured internet connection or on a CD-ROM. The method of EP 1 645 992 A1 provides an opportunity of tracking an item marked according to the marking method from the customer back to the production unit. However, EP 1 645 992 A1 does not provide a method of tracking a single cigarette packet from the production unit to a certain purchaser.

Furthermore, DE 199 51 140 A1 describes a method of controlling the integrity of a single cigarette packet. Nevertheless, the method described in DE 199 51 140 A1 is not suited for tracking a single cigarette packet from a production unit to a first purchaser.

According to the prior art, it is hardly possible and extremely time-consuming to link a cigarette packet packed into a carton to a master case, in which the carton with the cigarette packet is packed.

It is the object of the present invention to provide an opportunity for tracking a single cigarette packet from its production unit to a first purchaser.

BRIEF SUMMARY OF THE INVENTION

Various aspects of the invention are listed in independent claims 1 and 9.

Further aspects of the invention are listed in the respective dependent claims.

In a preferred embodiment, the method may comprise the additional steps of: Providing a unique case code on the case; and Recording an information that links the detected first unique code and all the unique codes of the cigarette packets that are packed into the same carton as the detected first unique code to the unique case code.

In an advantageous embodiment of the method, the first unique code and the second unique code are detected in the first carton after the packaging of the first cigarette packet and the second cigarette packet into the first carton, and wherein the detected first unique code and second unique code are transferred to the database for the recording of the information that at least the two cigarette packets with the first unique code and the second unique code are packed into the same carton in the database.

In another preferred embodiment of the method, the first carton is provided with an internal carton code, wherein the recorded information that at least the two cigarette packets with the first unique code and the second unique code are packed into the same carton comprises an additional information that links the first unique code and the second unique code to the internal carton code.

The present invention also describes a method for tracking cigarette packets comprising the step of: Packing at least a first cigarette packet labeled with a first unique code and a second cigarette packet labeled with a second unique code into a case according to the method of one of the paragraphs above.

Exemplary embodiments of the present invention are illustrated in the drawings and are explained in more detail in the description below.

In the figures, identical reference signs denote equivalent or functionally equivalent components.

DESCRIPTION OF THE PREFERRED EMBODIMENTS

Figure 1:
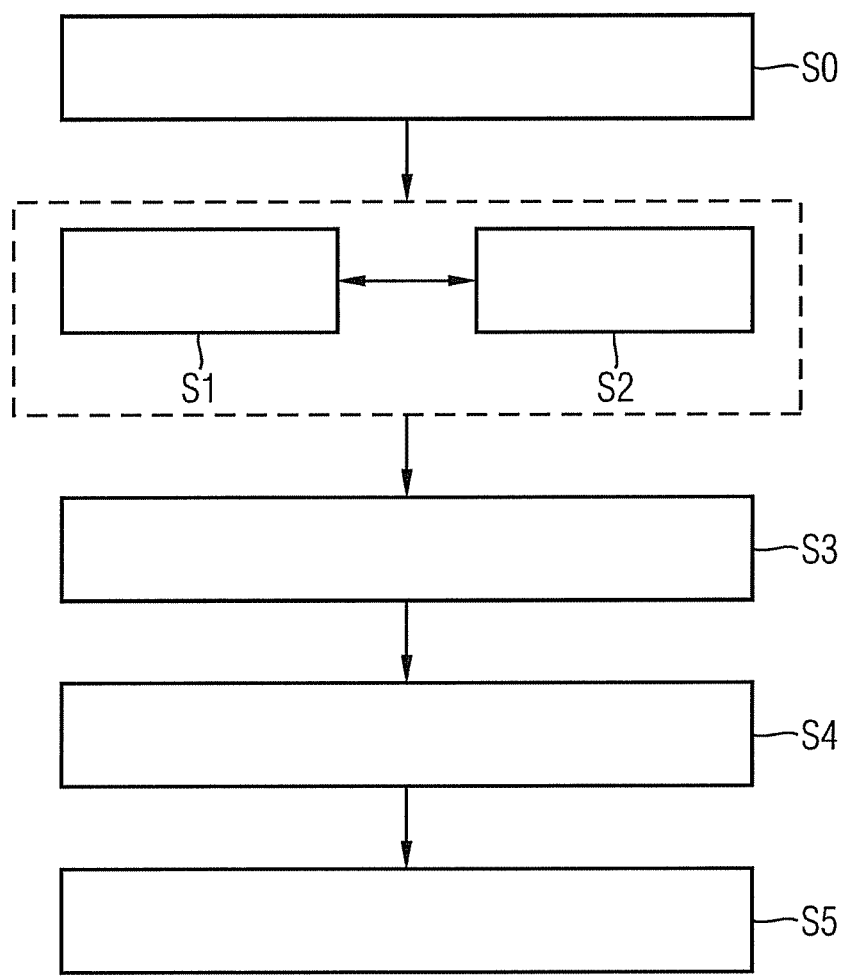
FIG. 1 shows a flowchart for illustrating a first embodiment of the method of cigarette packaging.

FIG. 1 shows a flowchart for illustrating a first embodiment of the method of cigarette packaging.

Before the method is started, a plurality of cigarette packets is provided in a step S0. Each of the provided cigarette packets is labeled with a unique code. For example, a first cigarette packet is labeled with a first unique code and a second cigarette packet is labeled with a second unique code different from the first unique code.

The unique code may be provided on the cardboard, on the poly film of each cigarette packet, on a label, on a sticker or on a tax stamp (closure). Of course, it is also possible to provide the same unique code on at least two different sides of a cigarette packet.

Preferably, the unique code is a machine-readable code. The unique code may be used as a tracking code to track a single sold cigarette packet to its purchaser. Normally, the purchaser buys a case, for example a master case, with a total number of cigarette packets between 50 and 1000 from a factory of a tobacco company. However, there is an interest on the side of the government to be able to track even a single sold cigarette packet from the factory to the first purchaser and thus to suppress a black market for cigarette packets.

In step S1 of the method of cigarette packaging, at least a first cigarette packet labeled with a first unique code and a second cigarette packet labeled with a second unique code are packed into a first carton. The number of cigarette packets packet into the first carton may be in a range from 5 to 20, for instance. The present invention is not restricted to a certain number of cigarette packets packet into the first carton.

The at least two unique codes of the at least two cigarette packets packed into the first carton are recorded in a database in step S2 as part of an information that the cigarette packets with these unique codes are packed into the same carton. Step S2 may be performed before or after step S1. The numbers S1 and S2 do not represent a chronological order.

For instance, the unique codes are scanned from a group of at least two cigarette packets and then only the cigarette packets of the group are packed into the first carton. In an alternative embodiment, a plurality of cigarette packets is packed into the first carton, which is later scanned by a first sensor unit designed to detect all the unique codes of the cigarette packets packed into the first carton (see example described in more details below).

The first carton may be provided with an internal carton code. In this case, the information stored in the database may comprise an additional information that links the internal carton code to the unique codes of all the cigarette packets packed into the first carton.

The first carton is packed into a case in an additional step S3. The case may be a master case. At least a second carton of the size of the first carton may be also packed into the case. The total number of cartons packet into the case may be between 5 and 100.

In a further step S4, the first unique code is detected in the case. This may be done by a second sensor unit that is designed to detect the unique code of only one cigarette packet of each carton in the case. For example, the second sensor unit may be designed to scan only one detection side of the case and thus only detects the cigarette packet of each carton that is the closest to the detection side.

However, due to the information recorded in the database, it is possible to read all the unique codes of the cigarette packets that are packed into the same carton as the detected first unique code from the database in a step S5. Therefore, it is not necessary to scan the whole case completely to detect all the unique codes of the cigarette packets in the case. The described method is therefore performable with a cheap second sensor unit in a short time.

It is also not necessary to label the first carton with all the unique codes of the cigarette packets packed into the first carton. It is further not necessary to label the first carton with a first unique carton code, to record an information that links the first unique carton code to the unique codes in the first carton and to detect the first unique carton code in the case.

The method described in the paragraphs above provides a fast way to obtain all the unique codes of cigarette packets packed into the same case. Thus, the described method is also suited for a manufacturing unit with a high production speed.

Figure 2:
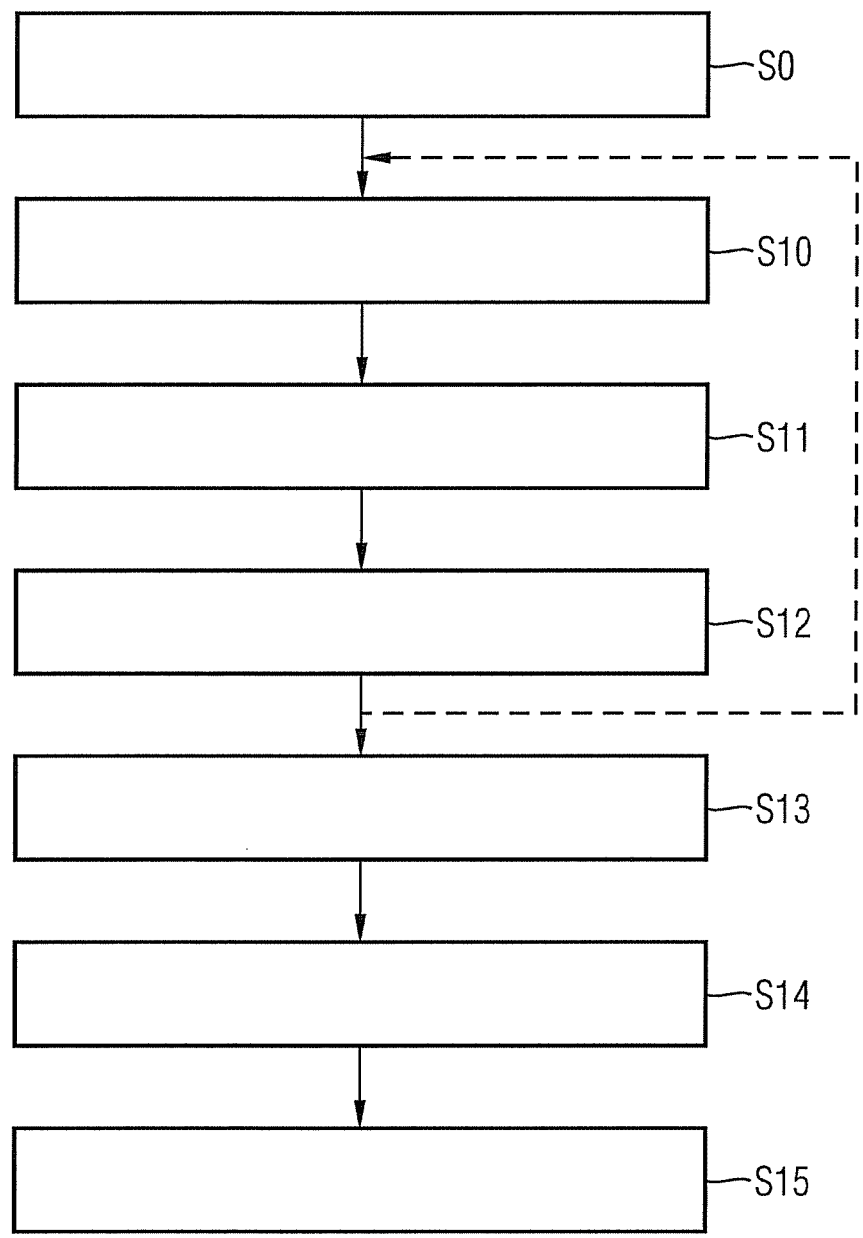
FIG. 2 shows a flowchart for illustrating a second embodiment of the method of cigarette packaging.

FIG. 2 shows a flowchart for illustrating a second embodiment of the method of cigarette packaging.

A unique code is applied to each cigarette pack of a plurality of cigarette packs in a step S0. Then, a constant number of cigarette packets are packed into a first carton in a step S10. The constant number of cigarette packets may be in a range between 5 and 20, for example. The first carton may then be closed or sealed with an adhesive.

In the following step S11, the unique codes of all the cigarette packets in the first carton are detected by a first sensor unit. The unique codes are detected in the first carton from the outside of the closed first carton. It is therefore advantageous to produce the first carton at least partially of a material that allows the detecting of the unique codes from the outside of the closed first carton, for example of a naked poly wrap material or of a carton material.

The detected unique codes of all the cigarette packets in the first carton are transferred to a database for the storage of the information that the cigarette packets with these unique codes are packed into the same carton. This is done in a step S12. Furthermore, it is possible to link a first internal carton code to the first carton. In this case, the unique codes detected by the first sensor unit are linked to the first internal carton code in the database.

The steps S10 to S12 may be repeated at least once to pack the constant number of cigarette packets into at least a second carton. Then, the unique codes of the cigarette packets gathered in the second carton are scanned and recorded in the database according to the description given above.

The first carton is packed into a master case in a further step S13. Preferably, at least the second carton is also packed into the master case in step S13. The number of cartons packed into the master case may be in a range between 5 and 50. The master case may then be closed or sealed with an adhesive.

In an additional step S14, the unique code of one cigarette packet of each carton gathered in the master case is detected by a second sensor unit. Thus, for each carton in the master case one unique code of a single cigarette packet is linkable to the master case. The number of unique codes detected by the second sensor unit is therefore equal to the number of cartons gathered within the same master case. The total number of cigarette packets in the master case is significantly higher than the number of cartons in the master case.

Due to the inventive technique, it is not necessary to detect all the unique codes of the total number of cigarette packets within the master case. Therefore, it is not necessary to design the second sensor unit to detect all the unique codes in the master case. Thus, the second sensor unit may be produced at low costs.

Preferable, the second sensor unit is arranged at an open side of the master case. Each of the cartons may be arranged in the master case in a way to have a carton wall that contacts the open side. In this case, the second sensor unit is designed to detect the cigarette packet of each carton that is at the closest to the open side.

To obtain all the unique codes of the cigarette packets in the master case, the unique codes detected by the second sensor unit are input into the database and all the unique codes of the cigarette packets that are packed into the same carton as one of the detected unique codes are read from the database (step S15). The method steps S14 and S15 may be performed much faster than a scanning of the whole master case to detect all the unique codes in the case.

In a further step not shown in FIG. 2, the second sensor unit may also detect a unique master case code, which is provided on the master case, and transfer the unique master case code to the database. In this case, the unique master case code may be linked to all the unique codes of the cigarette packets in the master case.

Furthermore, the method of FIG. 2 may be used for a method of tracking cigarette packets. When the master case is sold to a purchaser, the identity of the purchaser may be recorded together with the unique master case code. This can be done easily and fast when the purchaser orders or buys the master case.

Due to the information stored in the database, it is possible to link all the unique codes of the cigarette packets in the master case with the identity of the purchaser. This step may be performed very fast, even though the total number of cigarette packets in the master case may be in a range between 100 and 2000. Thus, each sold cigarette packet may be tracked to its purchaser.

Of course, the method of FIG. 1 may also be part of a similar method of tracking cigarette packets.

It is not necessary to scan all the unique codes of each sold cigarette packet during the ordering or the purchase of the cigarette packets. Thus, the method of tracking cigarette packets is very time-saving and does not require expensive instruments.

Figure 3:
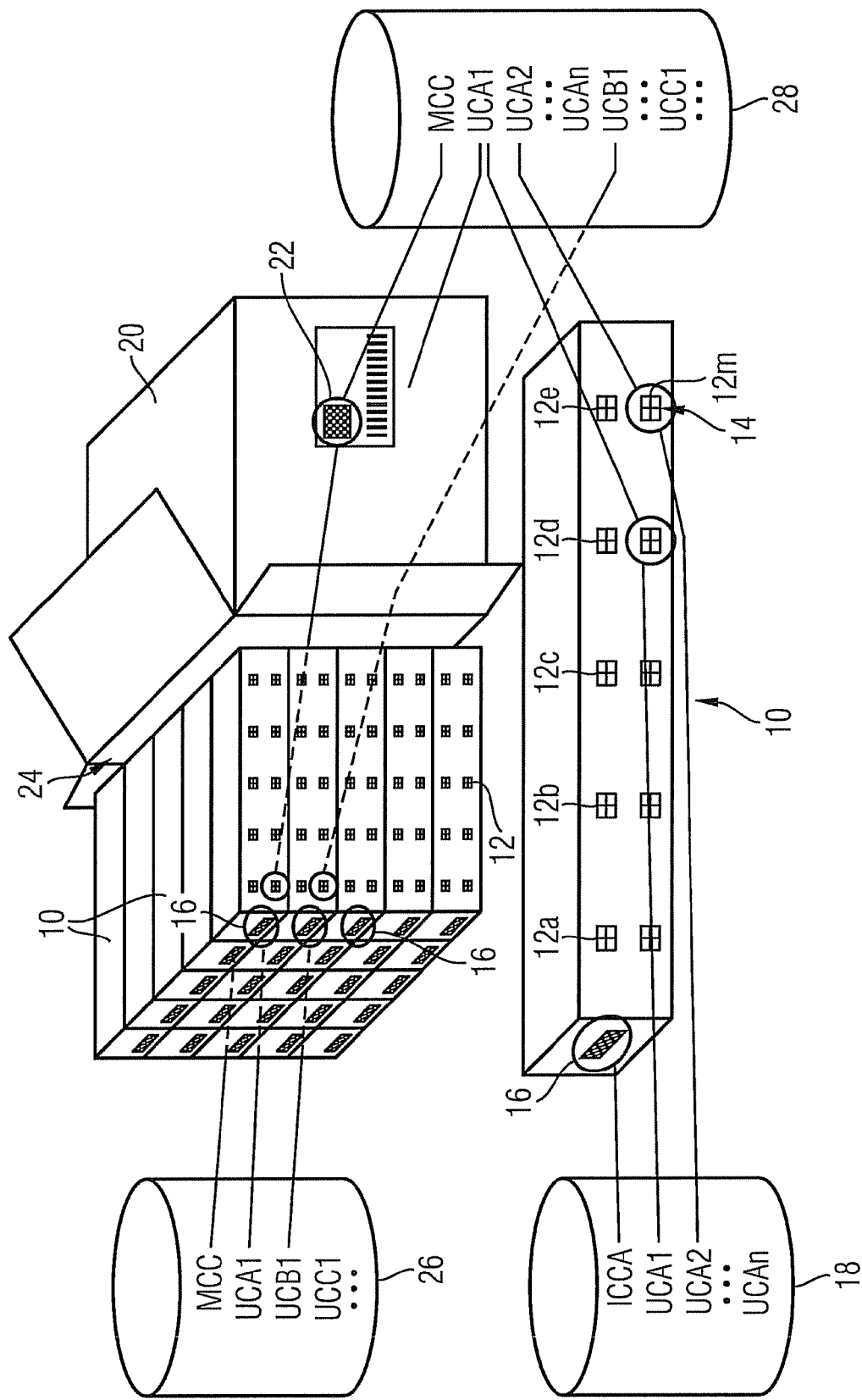
FIG. 3 shows a plurality of cartons packed into a master case for illustrating a third embodiment of the method of cigarette packaging.

FIG. 3 shows a plurality of cartons packed into a master case for illustrating a third embodiment of the method of cigarette packaging. For a better illustration, one of the cartons is enlarged.

Each of the illustrated cartons 10 contains cigarette packets labeled with a unique code 12a to 12m. Each of the unique codes 12a to 12m differs from the other unique codes 12a to 12m of the other cigarette packets packet in the carton 10. For instance, the first unique code 12a of a (not shown) first cigarette packet differs from the other unique codes 12b to 12m in the carton 10. Also, the second unique code 12b of a (not shown) second cigarette packet differs from the third unique code 12c of a (not shown) third cigarette packet and the forth unique code 12d of a (not shown) forth cigarette packet and so on. Of course, the third unique code 12c is also different from the forth unique code 12d and the other unique codes 12e to 12m. In the present example, carton 10 contains a number of 10 cigarette packets. However, the present invention is not restricted to a certain number of cigarette packets in the carton 10.

Each carton 10 may also have windows 14 at the sides of the unique codes 12 of the cigarette packets in the carton 10. Thus, a (not shown) first sensor unit is able to read the unique codes 12 after the packaging of the cigarette packets into the carton 10. It is therefore not necessary to print the unique codes 12 on the carton 10.

It is possible to provide each carton 10 with its unique internal carton code 16. Of course, the unique internal carton code 16 may be printed on its carton 10. However, the inventive technique does not require the printing of the unique carton code 16 on its carton 10. Instead, the inventive technique makes the printing of the carton code 16 on its carton 10 unnecessary and is therefore more time-saving.

However, it is possible to link the internal carton code 16 to all the unique codes 12 detected in its carton 10 by the first sensor unit. For instance, an information 18 is recorded on a (not shown) database that links the internal carton code ICCA to the unique codes UCA1, UCA2 to UCAn.

A plurality of cartons 10 is then packed into a master case 20. The master case 20 is provided with a master case code 22 detectable by a (not shown) second sensor unit. The second sensor unit is also designed to detect a unique code 12 of one cigarette packet of each of the cartons 10 in the master case 20.

Preferably, a detection side 24 of the master case 20 is definable from which the second sensor unit detects the unique codes 12. In this case, unique codes 12 of the cigarette packets closest to the detection side 24 are detectable by the second sensor unit.

Thus, an information 26 is provided that links for example the master case code MCC to the unique codes UCA1, UCB1, UCC1 and so on. It is possible to combine information 18 and information 26. Thus, each unique code 12 of a cigarette packet in the master case 20 is linked to the master case code 22. For instance, an information 28 is provided that links master case code MMC to unique codes UCA1, UCA2 to UCAn, UCB1 and so on.

Figure 4:
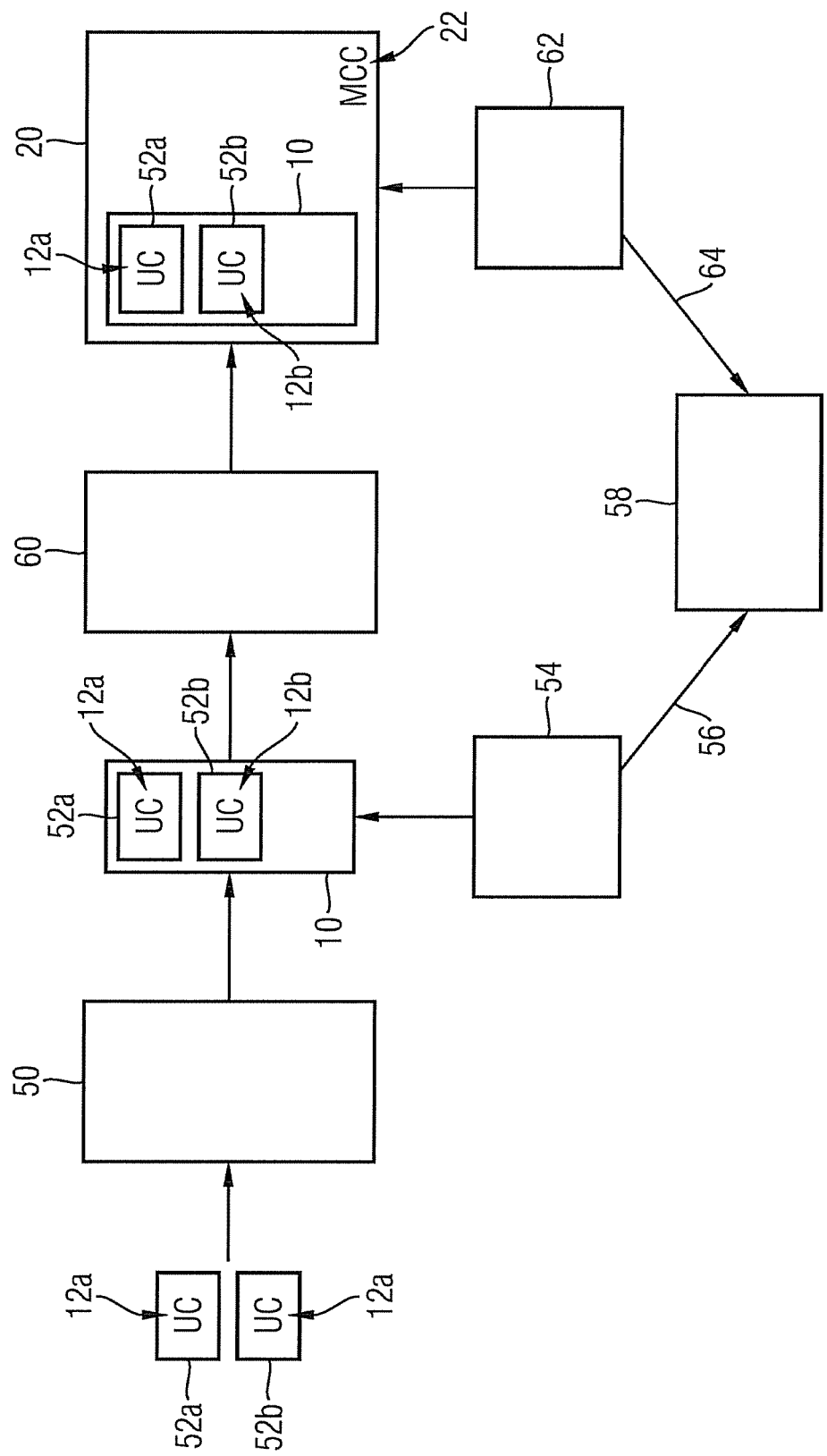
FIG. 4 shows a schematic layout for illustrating an embodiment of the cigarette packaging system.

FIG. 4 shows a schematic layout for illustrating an embodiment of the cigarette packaging system.

The cigarette packaging system comprises a first packing machine 50 that is designed to pack at least two cigarette packets 52a and 52b into a carton 10. However, the number of cigarette packets 52a and 52b packed into the carton 10 by the first packing machine 50 may be significantly higher. For instance, the first packing machine 50 packs between 5 and 20 cigarettes packets 52a and 52b into a single carton 10. The first packing machine 50 may be also designed to produce the carton 10 from a naked poly wrap material or a carton material.

Each of the cigarette packets 52a and 52b packed into the carton 10 by the first packing machine 50 has a unique code 12a. After the packaging of the cigarette packets 52a and 52b into the carton 10, a first sensor unit 54 detects all the unique codes 12a and 12b in carton 10. Then, the first sensor unit 54 transfers an information 56 comprising all the detected unique codes 12a and 12b of the same carton 10 to a control device 58.

The control device 58 comprises a (not shown) database. The information 56 transmitted by the first center unit 54 is recorded in the database by the control device 58. Thus, the control device 58 is able to output or read the information 56 anytime.

The carton 10 is packed into a master case 20 by a second packing machine 60. Preferably, the second packing machine 60 is designed to pack a number of cartons 10 within a range between 5 and 50 into a single master case 20. Thus, it is possible to sell a high number of cigarette packets 52a and 52b to a purchaser in a convenient way.

After the packaging of the cartons 10 into the master case 20, a second sensor unit 62 detects the unique code 12a of only one cigarette package 52a of each carton 10 in the master case 20. Furthermore, the second sensor unit 62 is designed to detect a master case code 22 provided on the master case 20. Thus, the second sensor unit 62 is able to transmit an information 64 to the control device 58 that links the unique code 12a of only one cigarette package of each carton 10 in the master case 20 to the corresponding master case code 22.

The control device 58 is designed to combine the information 56 stored on the database with the information 64 transmitted by the second sensor unit 62. Thus, even though the second sensor unit 62 detects only one unique code 12a of each carton 10, it is possible to link all the unique codes 12a and 12b of the cigarette packages 52a and 52b in the master case 20 with the corresponding master case code 22. Thus, the system illustrated in FIG. 4 provides the advantages of the embodiments described above.

It is obvious for a man skilled in the art that the present invention is not restricted to a certain form or type of a cigarette packet 52a and 52b, a carton 10 or a case. For instance, at least two cigarette packets 52a and 52b may also be packed in a bundle and the bundle may then be packet in a case according to the embodiments described above.

The invention claimed is:

1. A method of cigarette packaging, the method comprising the steps of:
   packing at least a first cigarette packet labeled with a first unique code and a second cigarette packet labeled with a second unique code, wherein the unique code is provided on a cardboard, a poly film, a label, a sticker or a tax stamp of each cigarette packet, into a first carton with windows at the sides of the unique codes of the cigarette packets in the first carton;
   detecting the unique codes of all the cigarette packets in the first carton after the packaging of at least the first cigarette packet and the second cigarette packet into the first carton, wherein the unique codes are detected in the first carton from the outside of the closed first carton;
   using a control unit to record the at least two unique codes of the at least two cigarette packets into the first carton as part of an information that at least the two cigarette packets with the first unique code and the second unique code are packed into the same carton in a database;
   packing the first carton and at least a second carton into a case, wherein at least a third cigarette packet labeled with a third unique code and a fourth cigarette packet labeled with a fourth unique code are packed into the second carton, and wherein the third and fourth unique codes are provided on a cardboard, a poly film, a label, a sticker or a tax stamp of each cigarette packet, the second carton having windows at the sides of the unique codes of the cigarettes packets in the second carton;
   detecting the first unique code in the case by detecting the unique code of only one cigarette packet of each carton in the case; and
   using the control unit to input the detected first unique code into the database and to read from the database all the unique codes of the cigarette packets that are packed into the same carton as the detected first unique code.

2. The method of claim 1, wherein the first carton is made at least partially of a material that allows the detection of the first unique code and the second unique code from the outside of the closed first carton.

3. The method of claim 1, wherein the first unique code is detected in the case from the outside of the closed case.

4. The method of claim 1, wherein the first carton is provided with an internal carton code, and wherein the recorded information that at least the two cigarette packets with the first unique code and the second unique code are packed into the same carton comprises an additional information that links the first unique code and the second unique code to the internal carton code.

5. A cigarette packaging system comprising:
   a control device with a database;
   a first packing machine that is designed to pack at least a first cigarette packet labeled with a first unique code and a second cigarette packet labeled with a second unique code, wherein the unique code is provided on a cardboard, a poly film, a label, a sticker or a tax stamp of each cigarette packet, into a first carton with windows at the sides of the unique codes of the cigarette packets in the first carton;
   a first sensor unit that is designed to detect at least the first unique code and the second unique code in the first carton, wherein at least the first unique code and the second unique code are detected in the first carton from outside of the closed first carton, and to provide the at least two unique codes of the at least two cigarette packets into the first carton as part of an information that at least the two cigarette packets with the first unique code and the second unique code are packed into the same carton to the control unit, wherein the control unit is designed to record the provided information in the database;
   a second packing machine that is designed to pack at least the first carton and a second carton into a case, wherein at least a third cigarette packet labeled with a third unique code and a fourth cigarette packet labeled with a fourth unique code are packed into the second carton, wherein the third and fourth unique codes are provided on a cardboard, a poly film, a label, a sticker or a tax stamp of each cigarette packet, the second carton having windows at the sides of the unique codes of the cigarette packets in the second carton; and
   a second sensor unit that is designed to detect the first unique code in the case by detecting the unique code of only one cigarette packet of each carton in the case and to transmit the detected first unique code to the control unit, wherein the control unit is designed to read from the database all the unique codes of the cigarette packets that are packed into the same carton as the detected first unique code.

* * * * *